United States Patent [19]
Krüger et al.

[11] Patent Number: 5,385,981
[45] Date of Patent: Jan. 31, 1995

[54] THERMOPLASTIC FLUOROELASTOMERS PRODUCED BY GRAFT COPOLYMERIZATION

[75] Inventors: Ralf Krüger, Bergisch Gladbach; David B. Harrison; Leo Morbitzer, both of Cologne, all of Germany

[73] Assignee: Bayer Aktiengesellschaft, Leverkusen, Germany

[21] Appl. No.: 95,458

[22] Filed: Jul. 20, 1993

[30] Foreign Application Priority Data

Jul. 27, 1992 [DE] Germany ............... 4224768

[51] Int. Cl.⁶ .............. C08F 259/08; C08F 271/02
[52] U.S. Cl. ........................ 525/276; 525/281
[58] Field of Search ...................... 525/276, 281

[56] References Cited

U.S. PATENT DOCUMENTS

| | | |
|---|---|---|
| 4,158,678 | 6/1979 | Tatemoto et al. |
| 4,472,557 | 9/1984 | Kawashima et al. |
| 4,560,737 | 12/1985 | Yamamoto et al. |
| 4,748,204 | 5/1988 | Kawashima et al. |
| 4,749,610 | 6/1988 | Katsuragawa et al. |
| 5,214,115 | 5/1993 | Langstein et al. |
| 5,247,036 | 9/1993 | Kruger et al. |

FOREIGN PATENT DOCUMENTS

| | | |
|---|---|---|
| 422644 | 10/1990 | European Pat. Off. |
| 444700 | 3/1991 | European Pat. Off. |
| 0489314 | 6/1992 | European Pat. Off. |
| 1255493 | 12/1971 | United Kingdom. |
| 2161816 | 1/1986 | United Kingdom. |

*Primary Examiner*—Vasu S. Jagannathan
*Attorney, Agent, or Firm*—Sprung Horn Kramer & Woods

[57] ABSTRACT

Thermoplastic fluoroelastomer graft polymers formed from a fluorine-containing graft polymer formed from a rubber like (Tg<0° C.), uncrosslinked fluorine-containing copolymer containing double bonds as the graft base onto which is grafted a fluorine-containing monomer that gives an at least partly crystalline polymer are produced from the rubber-like uncrosslinked copolymer by radical polymerization in solution, suspension or emulsion under elevated pressure at about −15° to +120° C., and grafting thereon a monomer which forms an at least partly crystalline polymer the grafting onto the rubber-like copolymer taking place by radical solution, suspension or emulsion graft polymerization under elevated pressure at about −15° to +120° C.

2 Claims, No Drawings

THERMOPLASTIC FLUOROELASTOMERS PRODUCED BY GRAFT COPOLYMERIZATION

This invention relates to a fluoroelastomer composition. More particularly, the invention relates to a segmented, fluorinated thermoplastic elastomer which may be molded and used without any need for vulcanization.

Fluorine-containing rubbers generally give vulcanizates characterized by satisfactory mechanical properties and high resistance to heat, oil, ozone, and irradiation. By virtue of these properties, applications hitherto not possible with any other type of rubber have been opened up by fluororubbers. Since fluororubbers are no longer processable after vulcanization, it is desirable to produce an uncrosslinked thermoplastically processable fluororubber similar in its resistance and mechanical properties to a vulcanized rubber. In addition, process steps are eliminated during the processing of such an elastomer: a) production of the vulcanization mixture; b) time-and energy-consuming part-vulcanization, for example for 24 h at 230° C. A rubber such as this is known as a fluorinated "thermoplastic elastomer" (F-TPE).

Thermoplastic elastomers acquire their physical, more particularly mechanical, properties from so-called hard segments which form associates (i.e. physical crosslinking points) in the matrix of the rubber-like soft segments. Segments capable of forming associates are either segments which have been formed from at least partly crystalline polymer blocks or amorphous segments having high glass transition temperatures which are incompatible with the soft segment and which, after phase separation, remain fixed as associates in the solidified state.

Accordingly, a "block" or "comb" graft polymer is produced, consisting of a rubber-like segment and at least two "hard" segments. One example of this type of thermoplastic elastomer is the styrene/butadiene triblock copolymer.

It is known from the prior art that iodine-terminated A-B-A segmented fluorine-containing copolymers can be produced by initially preparing a rubber-like fluorine-containing copolymer of which the molecular weight is regulated by iodine-containing compounds. After the first step, the polymerization is continued by polymerization monomers which give an at least partly crystalline polymer or copolymer, in the presence of a dispersion of the iodine-containing, rubber-like copolymer mentioned above (U.S. application No. 4,158,678, EP-A 44 700, EP-A 422 644). The use of iodine compounds is ecologically problematical. Furthermore, obtain moldings having useful mechanical properties, subsequent radiation hardening is generally necessary (EP-A 444 700).

The production of segmented fluorinated copolymers having a "comb" structure is described in U.S. application No. 4,472,557. Fluorine-containing copolymers containing peroxy groups as lateral groups are produced in emulsion by copolymerization of one or more fluorine-containing monomers and an allyl compound containing a peroxy group. The copolymer then has to be isolated. The polymerization reaction is then continued in Frigen R-113 by using the polymer-bound peroxy groups to initiate the polymerization of other fluorine-containing monomers. The process in question is complicated because the peroxyfunctional graft base has to be isolated in an intermediate step to remove the unreacted peroxyfunctional allyl compound. For kinetic reasons, the use of a macroinitiator as graft base is unfavorable because it either requires long reaction times or leads to low graft yields.

The present invention relates to segmented, fluorine-containing thermoplastic elastomers formed by grafting of monomers, which build up an at least partly crystalline (preferably fluorine-containing) (co)polymer, onto uncrosslinked fluorine elastomer segments containing lateral double bonds as the graft base.

The thermoplastic elastamer composition according to the invention comprises graft copolymers consisting of 95.0 to 45.0% by weight of a fluororubber containing lateral double bonds as the graft base and 5.0 to 55.0% by weight of an at least partly crystalline (preferably fluorine-containing) polymer or copolymer.

A fluororubber containing lateral double bonds is obtained by copolymerization of fluorine-containing monomers or mixtures of fluorine-containing and non-fluorine-containing monomers with small quantities of suitable monomers containing at least two olefinic double bonds such as alkenyl isocyanurates, alkenyl cyanurates and unconjugated dienes, for example triallyl (iso)cyanurate, 1,5-hexadiene or diallyl phthalate; see DE-A 4 038 588 and DE-A 4 114 598. Examples of the fluorine-containing monomers and combinations thereof used for the production of the uncrosslinked fluororubber are combinations of two or more fluorine-containing monomers, such as for example vinylidene fluoride/hexafluoropropene, vinylidene fluoride/tetrafluoroethylene/hexafluoropropene, tetrafluoroethylene/vinylidene fluoride/perfluoroalkyl perfluorovinyl ether, tetrafluoroethylene/propene, tetrafluoroethylene/vinylidene fluoride/propene, tetrafluoroethylene/vinylidene fluoride/hexafluoropropene/pentafluoropropene, tetrafluoroethylene/vinylidenfluoride/hexafluoropropene/perfluoroalkyl perfluorovinyl ether, tetrafluoroethylene/hexafluoropropene/hexafluoroisobutylene and vinylidene fluoride/chlorotrifluoroethylene/hexafluoropropene. The fluororubbers must be flowable and, accordingly, should be uncrosslinked, i.e. they should have gel contents of not more than 10.0% by weight A fluorine-containing, segmented thermoplastic elastomer is obtained by graft polymerization of monomers, which give an at least partly crystalline polymer or copolymer, onto the fluorine-containing rubber containing double bonds. Suitable monomers or monomer mixtures for the production of the partly crystalline segment are, for example, vinylidene fluoride, tetrafluoroethylene, chlorotrifluoroethylene, tetrafluoroethylene/hexafluoropropene, vinylidene fluoride/hexafluoropropene, tetrafluoroethylene/ethylene, tetrafluoroethylene/perfluoroalkyl perfluorovinyl ether, chlorotrifluoroethylene/ethylene; tetrafluoroethylene/ethylene/isobutylene, tetrafluoroethylene/ethylene/hexafluoropropylene, tetrafluoroethylene/ethylene/pentafluoropropylene, tetrafluoroethylene/ethylene/hexafluoroisobutylene or vinylidene fluoride/hexafluoroisobutylene, etc. After the grafting reaction, the resulting fluorinated thermoplastic elastomer may be processed without any need for vulcanization to form moldings having elastomeric properties and high heat resistance values which are limited solely by the melting temperature of the crystalline segment.

In the first step of the process according to the invention, a fluororubber containing lateral double bonds is prepared in aqueous dispersion or in a solvent, preferably by emulsion polymerization. The polymerization reaction is then continued without any need to isolate the fluororubber by grafting the monomers which give an at least partly crystalline polymer onto the above-mentioned fluororubber containing double bonds in the medium determined in advance by the first step, i.e. in aqueous dispersion, in a solvent or in bulk, preferably by emulsion polymerization or precipitation polymerization. In the case of the above-mentioned solution or precipitation polymerization, the copolymerization reaction or grafting reaction is carried out in a polymerization solvent having a relatively low chain-transfer capacity, such as for example perfluoro-(1,2-dichloroethane), perfluoro-(1,2,2trichloroethane), perfluorocyclohexane, t-butanol, methyl acetate, t-butyl acetate, methyl formate, t-butyl formate, methyl ethyl ketone or a combination of two or more of these solvents.

The process for the production of the fluorinated thermoplastsic elastomer based on a fluororubber containing double bonds is characterized in that the rubber mentioned and monomers which form an at least partly crystalline polymer and also 0 to 100 relative-% of initiator, based on the intended total quantity of initiator, are introduced into the reaction autoclave and the rest of the intended quantity of initiator is added after the desired reaction temperature has been reached.

Suitable initiators are the compounds known per se used in radical polymerization, such as for example organic peroxides, azo compounds and inorganic per compounds. The peroxides include, for example, benzoyl peroxide, dicyclohexyl peroxydicarbonate or t-butyl perpivalate. Among the azo compounds, azo-bis-(isobutyronitrile) and azo-bis-(2,4-dimethyl valeronitrile), for example, are suitable. Persulfates, hydrogen peroxide, perchlorates, etc., are mentioned as examples of inorganic per compounds. This inorganic peroxides may also be used in a redox system together with a reducing agent, such as for example sulfite, hyposulfite, ethanolamine, etc.

The various polymerization reactions mentioned above are generally carried out at a temperature of approx. $-15°$ to $+120°$ C. The polymerization pressure is not particularly limited and is generally in the range from about 2 to 60 bar.

The invention will be further described with reference to the following examples:

EXAMPLES

Production of the rubber base
Fluororubber 1

9 g lithium perfluoroctane sulfonate and 15 g potassium peroxydisulfate were dissolved in 2,500 ml deionised water. The resulting solution was adjusted to pH 11.1 and introduced into a 6 liter autoclave. The closed autoclave was then placed three times under a nitrogen pressure of 10 bar and was subsequently vented to normal pressure. 490 g vinylidene fluoride, 730 g hexafluoropropene and 4 ml of a solution containing 0.45 g triallyl isocyanurate per 1.0 ml methyl acetate were then introduced into the autoclave and the reaction mixture heated with stirring to a temperature of 50° C. and a pressure of 30.6 bar. The polymerization was initiated by the continuous addition of 6.0 ml per hour of an aqueous solution containing 0.075 g triethanolamine per 1.0 g water. During the polymerization 20.0 ml per hour of a solution containing 0.45 g Triallyl isocyanurate per 1.0 ml methyl acetate were continuously added, and a monomer mixture consisting of 10 g hexafluoropropene and 15 g vinylidene fluoride were introduced whenever the reaction pressure fell by 0.5 bar in order to maintain the original pressure. After a total of 200 g hexafluoropropene, 300 g vinylidene fluoride and 70 ml of the triallyl isocyanurate solution had been added, the contents of the auto clave were cooled to room temperature and the unreacted gas mixture vented. A coagulate-free aqueous emulsion having a pH value of 5.8 and a solids content of 19.1% was obtained. To coagulate a sample of the product, part of the emulsion was acidified to a pH value of ca. 2 with dilute sulfuric acid, and poured into a 4% aqueous magnesium sulfate solution. The product was washed with water and then dried, a rubber-like copolymer containing vinylidene fluoride, hexafluoropropene and triallyl isocyanurate being obtained. The copolymer was soluble in such solvents as dimethyl formamide, dimethyl acetamide, acetone, methyl ethyl ketone and tetrahydrofuran; the intrinsic viscosity was 1.69 dl/g (THF, 25° C.). The molar ratio of vinylidene fluoride to hexafluoropropene in the copolymer was determined by $^{19}F$ nuclear resonance spectroscopy and was 81.3:18 7. The content of copolymerised triallyl isocyanurate of 0.6% by weight was determined by nitrogen analysis. The presence of free double bonds can be detected by addition iodine bromide. The HANUS iodine value 0.4 g iodine per 100 g copolymer.

Fluororubber 2

51 g lithium perfluorooctane sulfonate and 86 g potassium peroxidisulfate were dissolved in 14,300 ml deionised water. The resulting solution was adjusted to pH 10,0 and introduced into a 40 liter autoclave. The closed autoclave was then placed three times under a nitrogen pressure of 10 bar and was subsequently vented to normal pressure. 2746 g vinylidene fluoride and 4292 g hexafluoropropene were then introduced into the autoclave and the reaction mixture heated with stirring to a temperature of 50° C. and a pressure of 33.3 bar. The polymerisation was initiated by the continuous addition of 90.0 ml per hour of an aqueous solution containing 0.077 g triethanolamine per 1.0 g water. During the polymerisation 35.0 ml per hour a solution containing 0.4 g triallyl isocyanurate per 1.0 ml methyl acetate were continuously added, and a monomer mixture consisting of 60 g hexafluoropropene and 90 g vinylidene fluoride were introduced whenever the reaction pressure fell by 0.5 bar in order to maintain the original pressure. After a total of 1180 g hexafluoropropene, 1771 g vinylidene fluoride and 53 ml of the triallyl isocyanurate solution had been added, the contents of the autoclave were cooled to room temperature and the unreacted gas mixture vented. A coagulate-free aqueous emulsion having a pH value of 5.8 and a solids content of 18.6% was obtained. To coagulate the product, the emulsion was acidified to a pH value of ca. 2 with dilute sulfuric acid, and poured into a 4% aqueous magnesium sulfate solution. The product was washed with water and then dried, a rubber-like copolymer containing vinylidene fluoride, hexafluoropropene and triallyl isocyanurate being obtained. The copolymer was soluble in such solvents as dimethyl formamide, dimethyl acetamide. acetone, methyl ethyl ketone and tetrahydrofuran; the intrinsic viscosity was 1.76 dl/g (THF, 25° C.). The molar ratio of vinylidene fluoride to hexafluoropropene in the copolymer was determined by $^{19}F$ nuclear resonance spectroscopy and was 81.1:18.9. The content of copolymerised triallyl isocyanurate of 0.3% by weight was determined by nitrogen analysis.

Production of the graft polymers

EXAMPLE 1

700.0 g of the emulsion of fluororubber 1 were adjusted to a value of 10.0 and introduced into a 1.4 liter autoclave. The closed autoclave was placed three times under a nitrogen pressure of 10 bar and was subsequently vented to normal pressure. 120 g of vinylidene fluoride were introduced into the autoclave under pressure and the temperature of the reaction system increased to 90° C. The polymerisation was initiated by injection of 2 g potassium peroxydisulfate dissolved in 60 ml deionised water. At the start of the polymerisation the pressure in the reactor was 42.0 bar. This pressure fell to 40.2 bar after four hours. At this time the autoclave was cooled to room temperature and the unreacted vinylidene fluoride then vented to interrupt the grafting reaction.

On cooling to room temperature the emulsion coagulated without further treatment. The product was washed with water and dried to obtain a thermoplastically processable elastomer which was completely soluble in solvents such as dimethyl formamide and dimethyl acetamide. The product was compression molded at 185° C. for 5 minutes and subsequently demonstrated the properties as described in Table 1.

EXAMPLE 2

250.0 g of the emulsion of fluororubber 1 and 350 g deionised water were adjusted to a pH value of 10.0 and introduced into a 1.4 liter autoclave. The closed autoclave was placed three times under a nitrogen pressure of 10 bar and was subsequently vented to normal pressure. 120 g of vinylidene fluoride were introduced into the autoclave under pressure and the temperature of the reaction system increased to 90° C. The polymerisation was initiated by injection of 4 g potassium peroxydisulfate dissolved in 60 ml deionised water. At the start of the polymerisation the pressure m the reactor was 38.6 bar. This pressure fell to 29.3 bar after hours. At this time the autoclave was cooled to room temperature and the uncreacted vinylidene fluoride then vented to interrupt the grafting reaction.

On cooling to room temperature the emulsion coagulated without further treatment. The product was washed with water and dried to obtain a thermoplastically processable elastomer which was completely soluble in solvents such as dimethyl formamide and dimethyl acetamide. The product was compression molded at 185° C. for 5 minutes and subsequently demonstrated the properties as described in Table 1.

EXAMPLE 3

480.0 g of the emulsion of fluororubber 1 and 220 g deionised water were adjusted to a pH value of 10.0 and introduced into a 1.4 liter autoclave. The closed autoclave was placed three times under a nitrogen pressure of 10 bar and was subsequently vented to normal pressure. 100 g of vinylidene fluoride were introduced into the autoclave under pressure and the temperature of the reaction system increased to 90° C. The polymerisation was initiated by injection of 2 g potassium peroxydisulfate dissolved in 50 ml deionised water. At the start of the polymerisation the pressure in the reactor was 37.6 bar. This pressure fell to 32.0 bar after four hours. At this time the autoclave was cooled to room temperature and the unreacted vinylidene fluoride then vented to interrupt the grafting reaction.

On cooling to room temperature the emulsion coagulated without further treatment. The product was washed with water and dried to obtain a thermoplastically processable elastaomer which was completely soluble in solvents such as dimethyl formamide and dimethyl acetamide. The product was compression molded at 185° C. for 5 minutes and subsequently demonstrated the properties as described in Table 1.

EXAMPLE 4

250.0 g fluororubber 2 in the form of a solid were dissolved in 1000 g methyl acetate and introduced into a 1.4 liter autoclave. The closed autoclave was placed three times under a nitrogen pressure of 10 bar and was subsequently vented to normal pressure. 100 g of vinylidene fluoride were introduced into the autocclave under pressure and the temperature of the reaction system increased to 40° C. The polymerisation was initiated by injection of 2 g dicyclohexylperoxy dicarbonate dissolved in 20 ml methyl acetate. At the start of the polymerisation the pressure in the reactor was 10.5 bar. This pressure fell to 7.3 bar after eleven hours. At this time the autoclave was cooled to room temperature and the unreacted vinylidene fluoride then vented to interrupt the grafting reaction.

The reaction mixture was diluted isopropanol and the product precipitated into water. The product was washed with water and dried to obtain a thermoplastically processable graft copolymer which was completely soluble in solvents such as dimethyl formamide and dimethyl acetamide. The product was compression molded at 185° C. for 5 minutes and subsequently demonstrated the properties as described on Table 1.

EXAMPLE 5

220.0 g fluororubber 2 in the form of a solid were dissolved in 900 g methyl acetate and introduced into a 1.4 liter autoclave. The closed autoclave was placed three times under a nitrogen pressure of 10 bar and was subsequently vented to normal pressure. 70 g of vinylidene fluoride were introduced into the autoclave under pressure and the temperature of the reaction system increased to 40° C. The polymerisation was initiated by injection of 3 g dicyclohexylperoxy dicarbonate dissolved in 30 ml methyl acetate. At the start of the polymerisation the pressure in the reactor was 11.6 bar. This pressure fell to 9.7 bar after ten hours. At this time the autoclave was cooled to room temperature and the unreacted vinylidene fluoride then vented to interrupt the grafting reaction.

The reaction mixture was diluted with isopropanol and the product precipiated into water. The product was washed with water and dried to obtain a thermoplastically processable graft copolymer which was completely soluble in solvents such as dimethyl formamide and dimethyl acetamide. The product was compression molded at 185° C. for 5 minutes and subsequently demonstrated the properties as described in Table 1.

Comparison Examples

Production of the rubber base
Fluororubber 3

9 g lithium perfluorooctane sulfonate and 15 g potassium peroxydisulfate were dissolved in 2,400 ml deionised water. The resulting solution was adjusted to pH 10,7 and introduced into a 6 liter autoclave. The closed autoclave was then placed three times under a nitrogen pressure of 10 bar and was subsequently vented to normal pressure. 180 g vinylidene fluoride and 320 g hexafluoropropene were then introduced into the autoclave and the reaction mixture heated with stirring to a temperature of 50° C. and a pressure of 14.9 bar. The polymerisation was initiated by the continuous addition of 20.0 ml per hour for the first 90 minutes and 10 ml per hour thereafter of an aqueous solution containing 0.075 g triethanolamine per 1.0 g water. During the polymerisation a monomer mixture consisting of 10 g hexafluoropropene and 15 g vinylidene fluoride were introduced whenever the reaction pressure fell by 1.0 bar in order to maintain the original pressure. After a total of 240 g hexafluoropropene and 360 g vinylidene fluoride had been added, the contents of the autoclave were cooled to room temperature and the unreacted gas mixture vented. A coagulate-free aqueous emulsion having a pH value of 4.0 and a solids content of 12.7% was obtained. To coagulate a sample of the product, part of the emulsion was acidified to a pH value of ca. 2 with dilute sulfuric acid, and poured into a 4% aqueous magnesium sulfate solution. The product was washed with water and then dried, a rubber-like copolymer containing vinylidene fluoride and hexafluoropropene in a molar ratio of 75:25, as determined by $^{19}F$ nuclear resonance spectroscopy, being obtained. The copolymer is soluble in such solvents as dimethyl formamide, dimethyl acetamide, acetone, methyl ethyl ketone and tetrahydrofuran; the intrinsic viscosity is 0.805 dl/g (DMF, 25° C.).

Comparison Example 1

1.5 g lithium perfluorocaprylate were dissolved in 300.0 g of the emulsion of fluororubber 3 which was then adjusted to a pH value of 10.0 with lithium hydroxide and introduced into a 0.7 liter autoclave. The closed autoclave was placed three times under a nitrogen pressure of 10 bar and was subsequently vented to normal pressure. 50 g of vinylidene fluoride were introduced into the autoclave under pressure and the temperature of the reaction system increased to 70° C. The polymerisation was initiated by injection of 0.6 g potassium peroxydisulfate dissolved in 20 ml deionised water. At the start of the polymerisation the pressure in the reactor was 27.5 bar. This pressure fell to 24.0 bar after 15 minutes. At this time the autoclave was cooled to room temperature and the unreacted vinylidene fluoride then vented to interrupt the grafting reaction.

On cooling to room temperature the emulsion coagulated without further treatment. The product was washed with water and dried to obtain a product which was completely soluble in solvents such as dimethyl formamide and dimethyl acetamide. The product was compression molded at 185° C. for 5 minutes and subsequently demonstrated the properties as described in Table 2.

Comparison Example 2

1.5 g lithium perfluorocaprylate and 0.6 g potassium peroxydisulfate were dissolved 300.0 g of the emulsion of fluororubber 3 which was then adjusted to a pH value of 10.0 with lithium hydroxide and introduced into a 0.7 liter autoclave. The closed autoclave was placed three times under a nitrogen pressure of 10 bar and was subsequently vented to normal pressure. 50 g of vinylidene fluoride were introduced into the autoclave under pressure and the temperature of the reaction system increased to 70° C. The pressure of 28.8 bar attained on reaching the reaction temperature of 70° C. fell to 24.0 bar after 34 minutes. At this time the autoclave was cooled to room temperature and the unreacted vinylidene fluoride then vented to interrupt the grafting reaction.

On cooling to room temperature the emulsion coagulated without further treatment. The product was washed with water and dried to obtain a product which was completely soluble in solvents such as dimethyl formamide and dimethyl acetamide. The product was compression molded at 185° C. for 5 minutes and subsequently demonstrated the properties as described in Table 2.

Comparison Example 3

63.3 g of polyvinylidene fluoride emulsion having a solids content of 13.5% and an intrinsic viscosity of the solids of 0.97 dl/g (DMF, 25° C.) and 161.3 g emulsion of fluororubber 3 were mixed together to obtain a homogeneous emulsion. To coagulate the solid, this new emulsion was acidified to a pH value of ca. 2 th with dilute sulfuric acid and poured into a 4% aqueous magnesium sulfate solution. The product was washed with water and then dried to produce a product which was completely soluble in solvents such as dimethyl formamide and dimethyl acetamide. The product was compression molded at 185° C. for 5 minutes and subsequently demonstrated the properties as described in Table 2.

Comparison Example 4

22.5 g polyvinylidene fluoride having an intrinsic viscosity of 0.97 dl/g (DMF,25° C.) and 49.5 fluororubber 3 in solid form were introduced into a kneader. The mixture was then kneaded for 13 minutes at 185° C./50 r.p.m., a rubber-like mixture which was completely soluble in solvents such as dimethyl formamide and dimethyl acetamide. The product was compression moled at 185° C. for 5 minutes and subsequently demonstrated the properties as described in Table 2.

TABLE 1

| Property (A) | Patent Examples | | | | |
| --- | --- | --- | --- | --- | --- |
| | Example 1 | Example 2 | Example 3 | Example 4 | Example 5 |
| weight % Rubber | 95.2 | 85.8 | 71.5 | 93.5 | 84.6 |
| weight % PVDF | 4.8 | 14.2 | 28.5 | 6.5 | 15.4 |
| Tg of Rubber/°C. | −20 | −20 | −21,5 | −22 | −25,1 |
| Tm of PVDF/°C. | 155,5 | 167 | 157 | 47 | 173 |
| Stress at Break/MPa | 10.0 | 10.5 | 26.0 | 14.2 | 26.0 |
| Strain at Break/% | 1385 | 1130 | 800 | 780 | 900 |
| Residual Strain after deformation of 100%/% | 12 | 10 | 8 | 8 | 12 |
| Residual Strain after deformation of 400%/% | 58 | 66 | 58 | 75 | 100 |
| Shore A | 70.1 | 77.9 | 83.8 | 73.4 | 87.7 |
| MFI (220° C., | 0.78 | 1.29 | >0.01 | 0.11 | >0.01 |

TABLE 1-continued

| Property (A) | Patent Examples | | | | |
|---|---|---|---|---|---|
| | Example 1 | Example 2 | Example 3 | Example 4 | Example 5 |
| 10 kg)/g/10 min | | | | | |
| Gel content after processing/wt. % | <1 | <1 | 34 | 5 | 8 |

A: Composition determined by $^{19}$F nuclear magnetic resonance

TABLE 2

| Property (A) | Comparison Examples | | | |
|---|---|---|---|---|
| | Comparison Example 1 | Comparison Example 2 | Comparison Example 3 | Comparison Example 4 |
| weight % Rubber | 88.9 | 68.9 | 68.8 | 68.8 |
| weight % PVDF | 11.1 | 31.2 | 31.2 | 31.2 |
| Tg of Rubber/°C. | | −22 | −21 | −22 |
| Tm of PVDF/°C. | | 169 | 168 | 168 |
| Stress at Break/MPa | 9.0 | yield at 6.5 | yield at 2.5 | yield at 2.0 |
| Strain at Break % | 500 | 240 | 200 | 200 |
| Residual Strain after deformation of 100%/% | 29 | n.m. | n.m. | n.m. |
| Residual Strain after deformation of 400%/% | 208 | n.m. | n.m. | n.m. |
| Shore A | 86.3 | 89.3 | n.m. | 85.3 |
| MFI (220° C., 10 kg)/g/10 min | 6.05 | n.m. | n.m. | n.m. |
| Gel content after processing/wt. % | 2.3 | 1.6 | <1 | <1 |

A: Composition determined by $^{19}$F nuclear magnetic resonance
n.m. = not measured It will be appreciated that the instant specification and claims are set forth by way of illustration and not limitation, and that various modifications and changes may be made without departing from the spirit and scope of the present invention.

What is claimed is:

1. A fluorine-containing graft copolymer having the properties of a thermoplastic elastomer formed from an uncrosslinked fluorine-containing rubber having a $T_g<0°$ C. and containing double bonds as a graft base onto which is grafted at least one fluorine-containing unsaturated monomer or a mixture of fluorine-containing unsaturated monomers and non-fluorine-containing unsaturated monomers or a mixture of fluorine-containing unsaturated monomers wherein the monomers are such as to give an at least partly crystalline polymer or copolymer.

2. A fluorine-containing graft copolymer according to claim 1, wherein the graft base comprises about 95 to 50% by weight of the graft copolymer, and the monomers forming the graft comprise about 5 to 50% by weight of the graft polymer.

* * * * *